(12) United States Patent
Dyer et al.

(10) Patent No.: US 9,637,152 B2
(45) Date of Patent: May 2, 2017

(54) SUPPORT SHELF FOR A SHOPPING CART AND ASSOCIATED SHOPPING ASSEMBLY

(71) Applicant: TARGET BRANDS, INC., Minneapolis, MN (US)

(72) Inventors: Nicholas John Dyer, Saint Paul, MN (US); Stacy Lee Abel, Maple Grove, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 14/718,888

(22) Filed: May 21, 2015

(65) Prior Publication Data

US 2016/0339937 A1 Nov. 24, 2016

(51) Int. Cl.
*B62B 3/14* (2006.01)

(52) U.S. Cl.
CPC ............ *B62B 3/1468* (2013.01); *B62B 3/144* (2013.01)

(58) Field of Classification Search
CPC ... B62B 3/1408; B62B 3/1412–3/1424; B62B 3/1428; B62B 3/1472
See application file for complete search history.

(56) References Cited

U.S. PATENT DOCUMENTS

| | | | |
|---|---|---|---|
| 3,494,631 A | 2/1970 | Kreider | |
| 3,539,204 A * | 11/1970 | Keller | B43L 3/008 280/33.992 |
| 3,912,291 A * | 10/1975 | Frisch | B62B 3/1428 211/135 |
| 4,081,205 A | 3/1978 | Rosenacker | |
| 4,274,567 A * | 6/1981 | Sawyer | A45C 15/02 108/44 |
| 4,423,888 A * | 1/1984 | Addison | G09F 23/06 281/45 |
| 4,443,961 A * | 4/1984 | Gilroy | B62B 3/1408 40/308 |
| 4,450,994 A * | 5/1984 | Holland | B62B 3/1428 206/425 |
| 4,487,134 A | 12/1984 | Foote | |
| 4,583,753 A * | 4/1986 | Economy | B62B 3/1428 224/411 |
| 4,643,280 A | 2/1987 | Hensley | |
| 4,679,818 A | 7/1987 | Kakavas | |
| 4,685,701 A * | 8/1987 | Amundson | B62B 3/1428 224/277 |
| 4,702,402 A | 10/1987 | Ferri | |

(Continued)

*Primary Examiner* — Katy M Ebner
(74) *Attorney, Agent, or Firm* — JoAnn M. Seaton; Griffiths & Seaton PLLC

(57) ABSTRACT

A shopping assembly includes a shopping cart and a support shelf. The shopping cart includes a basket and a handle. The basket includes a rear wall having a top end, and the handle is spaced from the top end of the rear wall defining a space between the handle and the top end of the rear wall. The support shelf includes a cuff and a platform. The cuff is wrapped at least partially around the handle of the shopping cart to couple the support shelf to the shopping cart. The platform is positioned below and extends forwardly relative to the cuff toward the rear wall of the shopping cart. The platform has a top surface and a bottom surface opposite the top surface and rigidly extends between a front edge and a rear edge thereof. The cuff is positioned on a rear side of the rear edge of the platform.

20 Claims, 14 Drawing Sheets

(56) References Cited

U.S. PATENT DOCUMENTS

| | | |
|---|---|---|
| 4,901,901 A | 2/1990 | Reitenour |
| 4,966,318 A | 10/1990 | Dutka |
| 5,002,215 A * | 3/1991 | Gregoire ............... B62B 3/1428 206/425 |
| 5,004,252 A | 4/1991 | Kraper |
| 5,072,957 A | 12/1991 | Graebe, Jr. |
| 5,086,960 A * | 2/1992 | Schwietzer ........... B62B 3/1428 224/277 |
| 5,182,895 A | 2/1993 | Lugo |
| 5,203,578 A | 4/1993 | Davidson et al. |
| D340,339 S | 10/1993 | Kean et al. |
| 5,263,578 A | 11/1993 | Narvey |
| 5,362,077 A * | 11/1994 | Adamson ............... B62B 3/1472 211/71.01 |
| 5,417,353 A | 5/1995 | Stall |
| 5,494,308 A | 2/1996 | Southerland |
| 5,501,383 A * | 3/1996 | Wilson .................. B62B 3/1428 206/425 |
| D368,566 S | 4/1996 | Glaeser |
| 5,566,609 A * | 10/1996 | Kirschner ............. B62B 3/1428 108/42 |
| 5,636,818 A * | 6/1997 | Edwards ............... B62B 3/1408 248/214 |
| D411,904 S | 7/1999 | Risholm et al. |
| 6,158,640 A * | 12/2000 | Karp .................... B62B 3/1408 224/277 |
| D440,372 S | 4/2001 | Williams |
| D445,231 S | 7/2001 | Porter |
| 6,453,588 B1 * | 9/2002 | Lykens ..................... G09F 7/04 280/33.992 |
| D484,664 S | 12/2003 | Arceta |
| D492,829 S | 7/2004 | Babkes et al. |
| 6,944,981 B1 | 9/2005 | Garberg et al. |
| D523,207 S | 6/2006 | Tucker et al. |
| D536,503 S | 2/2007 | Weigand et al. |
| 7,195,155 B2 | 3/2007 | Garberg et al. |
| D548,921 S | 8/2007 | Gaddy |
| 7,374,182 B2 | 5/2008 | Gurley et al. |
| D583,123 S | 12/2008 | Cassin, III |
| D598,024 S | 8/2009 | Scott et al. |
| 7,673,410 B1 * | 3/2010 | Buerchner ............... A47F 13/00 24/10 R |
| 8,056,909 B2 * | 11/2011 | Burdwood ............ B62B 3/1404 280/33.991 |
| 8,077,453 B2 | 12/2011 | Swan et al. |
| 8,162,331 B2 | 4/2012 | Simonson et al. |
| 8,423,696 B2 | 4/2013 | Thordarson |
| 8,474,832 B2 * | 7/2013 | Mersky ................. B62B 3/1428 280/33.991 |
| 8,534,520 B1 * | 9/2013 | Liparoti ................ B62B 3/1428 224/277 |
| D696,483 S | 12/2013 | Otterlee et al. |
| 8,690,166 B2 | 4/2014 | Peota et al. |
| 9,120,496 B1 * | 9/2015 | Griffith .................... B62B 5/00 |
| 9,126,616 B2 * | 9/2015 | Crum ........................ B26B 5/00 |
| 2002/0084628 A1 | 7/2002 | Van Horn et al. |
| 2004/0080129 A1 * | 4/2004 | Myers .................... B62B 3/1428 280/33.992 |
| 2004/0189066 A1 * | 9/2004 | Beaty .................... B62B 3/1408 297/219.1 |
| 2006/0049591 A1 * | 3/2006 | Pennell ................. B62B 3/1468 280/33.992 |
| 2007/0273113 A1 | 11/2007 | Muir |
| 2009/0140505 A1 * | 6/2009 | Fryer .................... B62B 3/1408 280/33.994 |
| 2011/0011995 A1 * | 1/2011 | Tridon De Rey .... B62B 3/1408 248/214 |
| 2013/0313297 A1 * | 11/2013 | Belby ................... B62B 3/1428 224/411 |
| 2013/0341370 A1 * | 12/2013 | Larson ................. B62B 3/1428 224/411 |
| 2014/0069973 A1 * | 3/2014 | Peck ....................... B60R 11/02 224/411 |

* cited by examiner

SUPPORT SHELF FOR A SHOPPING CART AND ASSOCIATED SHOPPING ASSEMBLY

RELATED APPLICATION

This application is related to U.S. Design patent application Ser. No. 29/416,982, entitled "SHOPPING CART SHELF" filed on an even date May 21, 2015.

BACKGROUND OF THE INVENTION

Retailers devote considerable resources to shaping consumer experiences within a retail to store to make shopping within the store easier, more comfortable, and more appealing to those same consumers. For example, retailers commonly provide shopping carts to facilitate a consumer's selection, transport, and purchase of products within the retail store and, in some instances, transport of the products from the retail store. Shopping carts provide a place for consumers to place their belongings, products for purchase, and, in some instances, even for supporting a small child.

While shopping in a retail store, consumers routinely perform additional tasks that may or may not be related to shopping. For example, consumers often use mobile devices to inform their shopping decisions, to find discounts on products, to communicate with others, and/or to entertain their children as they shop in a retail store. In other instances, a consumer may have coupons, articles, shopping lists, or other items they would like to keep nearby while shopping. Oftentimes, it is challenging for a consumer to shop, maneuver a shopping cart, tend for a small child, and/or interact with other various items all during a single shopping trip.

SUMMARY OF THE INVENTION

One aspect of the present invention relates to a shopping assembly including a shopping cart and a support shelf. The shopping cart includes a basket and a handle. The basket includes a rear wall having a top end, and the handle is spaced from the top end of the rear wall defining a space between the handle and the top end of the rear wall. The support shelf includes a cuff and a platform. The cuff is wrapped at least partially around the handle of the shopping cart to couple the support shelf to the shopping cart. The platform is positioned below and extends forwardly relative to the cuff toward the rear wall of the shopping cart. The platform has a top surface and a bottom surface opposite the top surface and rigidly extends between a front edge and a rear edge thereof. The cuff is positioned on a rear side of the rear edge of the platform. A support shelf without the shopping cart and other apparatus, assemblies, and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

Embodiments of the invention are directed to a support shelf for use with a shopping cart. In one embodiment, the support shelf includes a cuff and a platform. The cuff is sized and shaped to selectively receive a handle of a shopping cart. The platform is coupled to the cuff and extends forwardly from the cuff to rest on a secondary portion of the shopping cart, such as a top end of a rear wall or gate of the shopping cart, in one embodiment. In this manner, the platform in maintained in a position between the handle and the secondary portion of the shopping cart with an upwardly facing top surface for receiving a mobile device or other consumer item. In one example, additional securing mechanisms are included near an edge of the platform opposite the cuff for selective coupling with the secondary portion of the shopping cart.

In one embodiment, the platform defines a laterally extending device reception groove for selectively receiving a mobile device in a largely vertical orientation facing an interior of the shopping cart. In one example, the top surface of the platform is formed by a skid-resistant material, such as rubber, acrylonitrile butadiene styrene (ABS) or other plastic, silicone or other suitable friction enhancing material, and/or tactile enhancement to more securely maintain a mobile device with added lateral and longitudinally stability on the top surface. In one aspect, the cuff includes additional features promoting lateral stability of the support shelf relative to the handle of the shopping cart. In one embodiment, the support shelf is configured to provide support for any number of items including, for example, a mobile device in at least one orientation. In one embodiment, the support shelf is configured to provide support for a mobile device or similarly shaped item in at least two different orientations.

Figure 1:
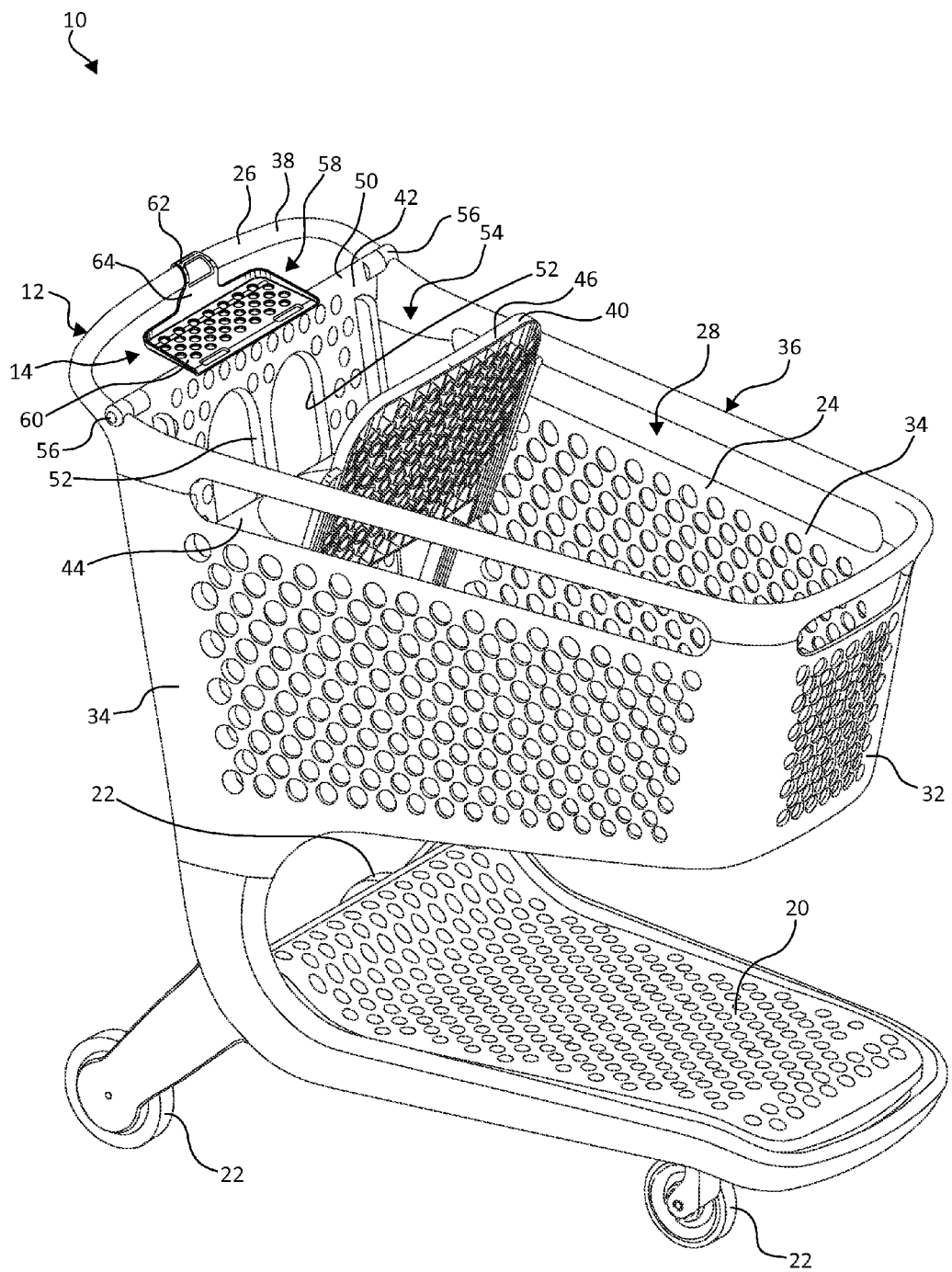
FIG. 1 is a perspective view illustration of a shopping assembly including a shopping cart with an auxiliary support shelf, according to an embodiment of the present invention.

Turning to the figures, FIG. 1 illustrates one embodiment of a shopping assembly 10 including a shopping cart 12 and a support shelf 14. Support shelf 14 selectively couples with shopping cart 12 and/or other similar shopping carts to provide an auxiliary support for holding non-merchandise consumer items, such as a mobile device 16 (see FIGS. 2 and 3) while a user shops in the retail store.

One example of shopping cart 12 includes a base 20, wheels 22, a basket 24, and a handle 26. Base 20 is formed near a bottom of shopping cart 12 and is coupled to wheels 22 configured to contact a floor (not shown) allowing relatively easy movement of shopping cart 12 over the floor. Basket 24 is spaced above base 20 and defines a chamber or storage area 28 therein for carrying items. More specifically, in one example, basket 24 defines a basket bottom wall (not shown), a basket front wall 32 and basket sidewalls 34. Each of front wall 32 and sidewalls 34 extend upwardly from bottom wall 30, and, in one example, are all formed of a wire, plastic, or other suitable frame. An open top 36 of basket 24 provides access to storage area 28.

Handle 26 is mounted near a top and rear of basket 24 and extends upwardly and/or rearwardly from rear portions of basket sidewalls 34, for example, in a substantially C-shape, to facilitate a consumer in driving or otherwise maneuvering shopping cart 12 through a retail store. Handle 26 is formed with any suitable cross-section such as a cross-sectional shape selected to fit comfortably in the grip of the consumer maneuvering shopping cart 12, for example, round or oval as illustrated. Handle 26 defines an outside surface 38 that interacts with hands of a consumer while the consumer maneuvers shopping cart 12.

In one example, shopping cart 12 includes a gate and seat assembly 40 at a rear of basket 24 to enable a child to travel in shopping cart 12 during consumer shopping. Seat assembly 40 includes a rear wall such as a gate 42, a seat 44, and a backrest 46, accordingly to one embodiment. Gate 42 is sized and shaped to selectively cover rear of storage area 28 opposite front wall 32. In one example, gate 42 defines a top end 50 that is pivotally coupled at opposing ends 56 thereof with basket 24 in a manner allowing gate 42 to rotate inwardly and upwardly from a first position enclosing a rear side of storage chamber 28 to a second positioned extending into storage chamber 28 to enable nesting of multiple shopping carts 12 together or to allow for transport of larger or more items in basket 24. In one embodiment, gate 42 is statically mounted to a remainder of basket 24 forming a static rear wall of basket 24.

Seat 44 is sized and shaped to support a child or small items. In one example, seat 44 is pivotally mounted to gate 42, which defines leg openings 52 in a position generally aligned with seat 44 such that a child sitting in seat 44 can have his/her legs extend rearwardly out of leg openings 52. Backrest 46 is pivotally coupled with a bottom portion (not shown) of gate 42. Seat 44 is pivotally coupled with backrest 46 opposite the coupling of seat 44 with gate 42 such that seat 44 and backrest 46 are pivotally moveably relative to each other. Child seating area 54 or other auxiliary chamber is defined above seat 44 between gate 42 and backrest 46. In one example, a space 58 is defined between top end 50 of gate 42 and handle 26. In this manner, seat 44 and backrest 46 are configured to collapse against gate 42 as gate 42 is pivoted upwardly about is coupling with backrest 46. In an embodiment, seat 44 and backrest 46 are eliminated.

Figure 2:
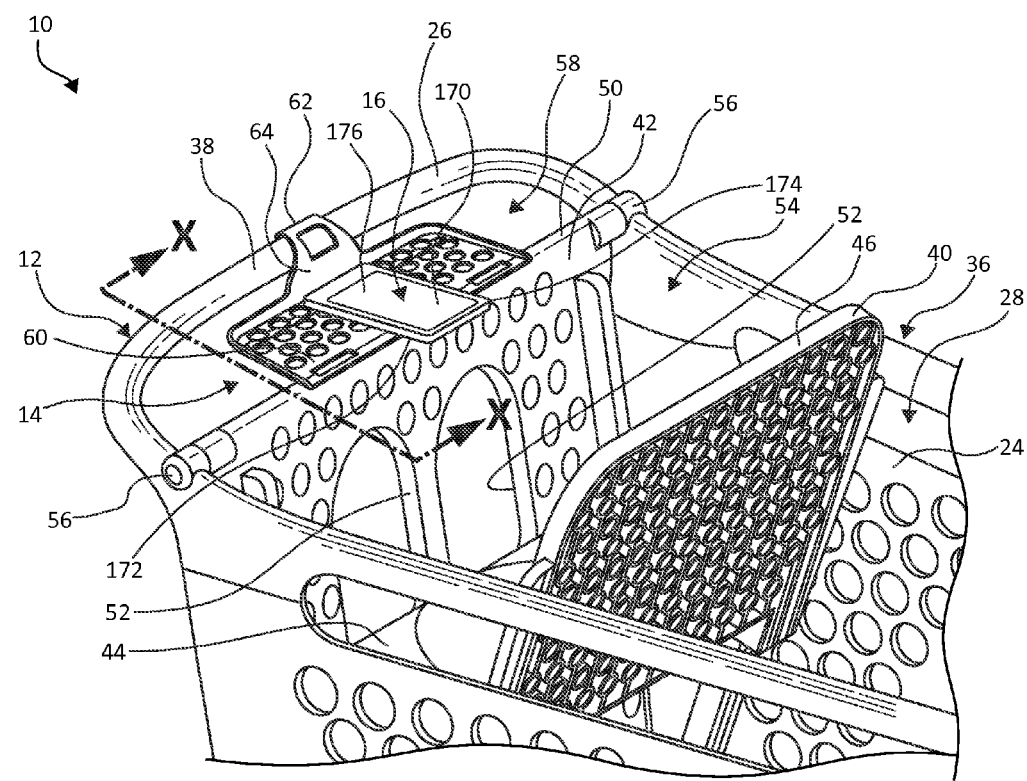
FIG. 2 is a partial perspective view illustration of the shopping assembly of FIG. 1 supporting a mobile device in a first position, according to an embodiment of the present invention.
Figure 3:
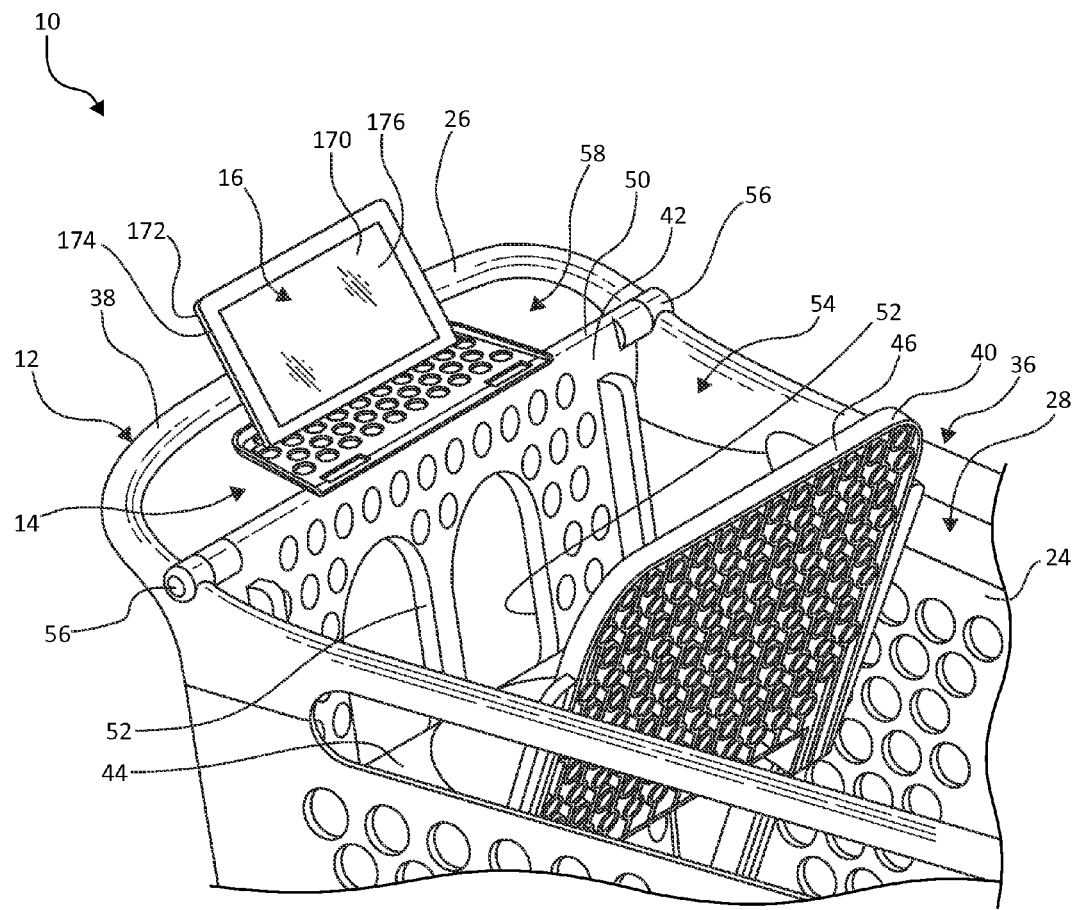
FIG. 3 is a partial perspective view illustration of the shopping assembly of FIG. 1 supporting a mobile device in a second position, according to an embodiment of the present invention.
Figure 4:
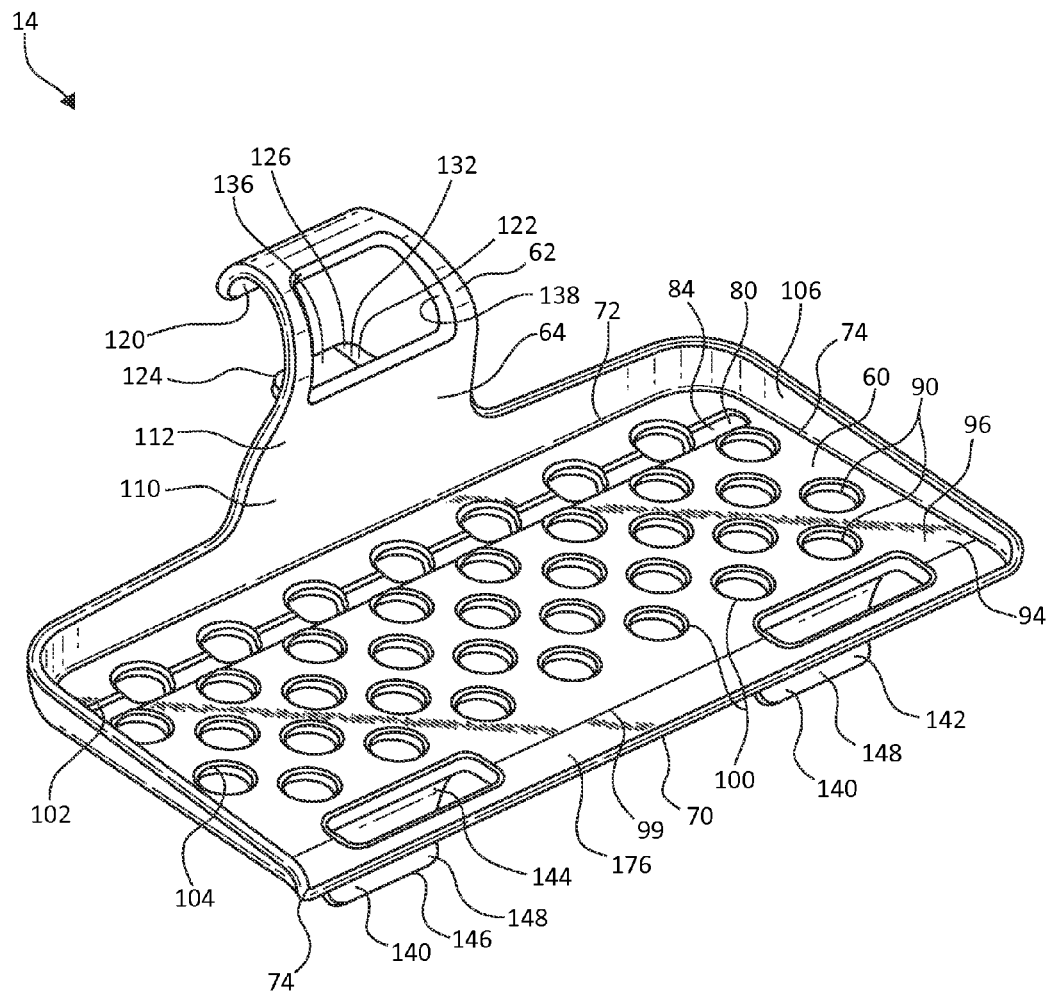
FIG. 4 is a perspective view illustration of the auxiliary support shelf of FIG. 1, according to an embodiment of the present invention.
Figure 5:
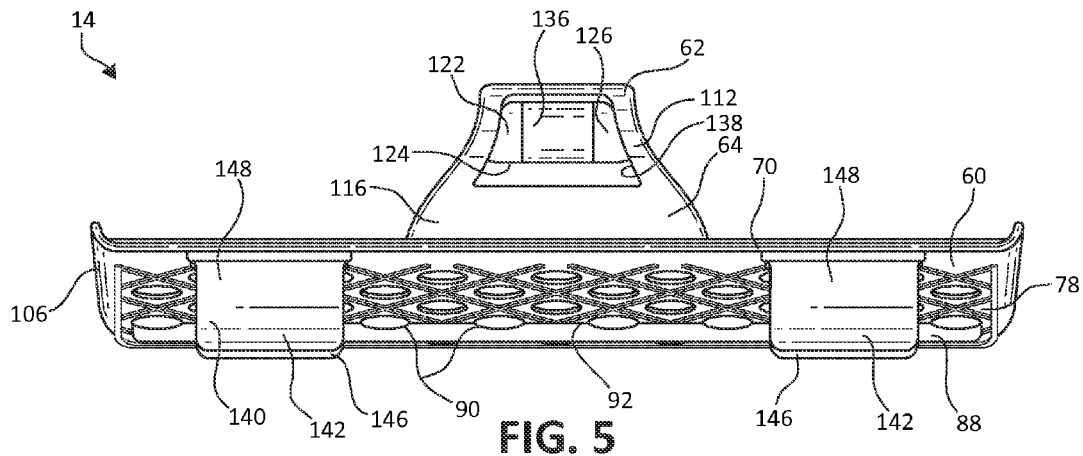
FIG. 5 is a front view illustration of the auxiliary support shelf of FIG. 4, according to an embodiment of the present invention.
Figure 6:
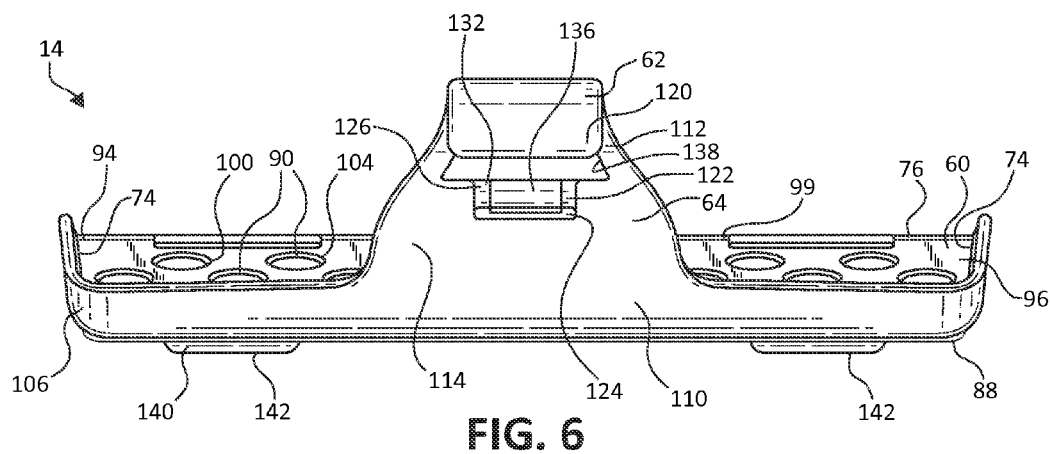
FIG. 6 is a rear view illustration of the auxiliary support shelf of FIG. 4, according to an embodiment of the present invention.
Figure 7:
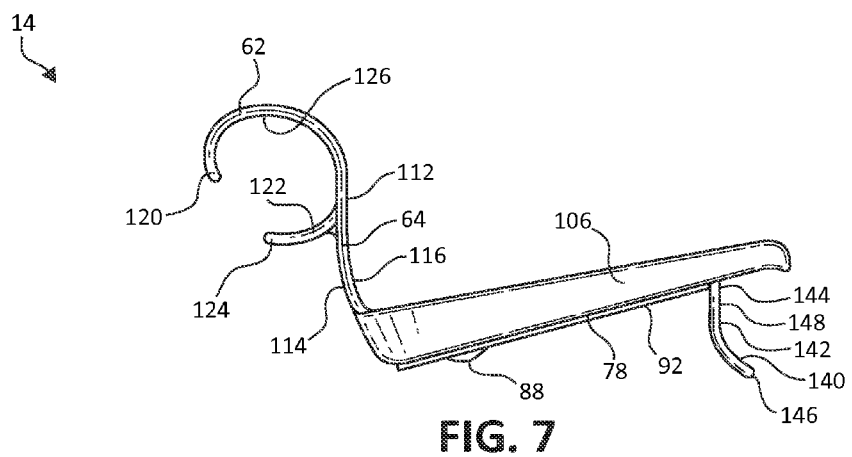
FIG. 7 is a right side view illustration of the auxiliary support shelf of FIG. 4 where the left side view is a mirror image thereof, according to an embodiment of the present invention.
Figure 8:
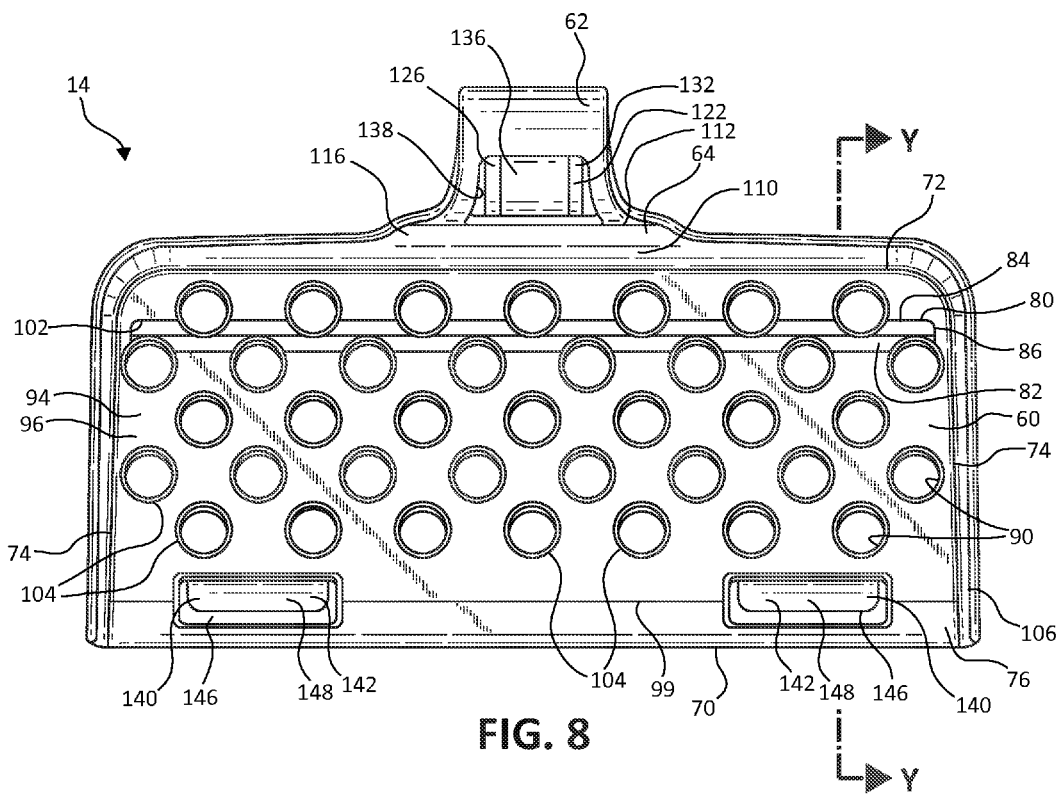
FIG. 8 is a top view illustration of the auxiliary support shelf of FIG. 4, according to an embodiment of the present invention.
Figure 9:
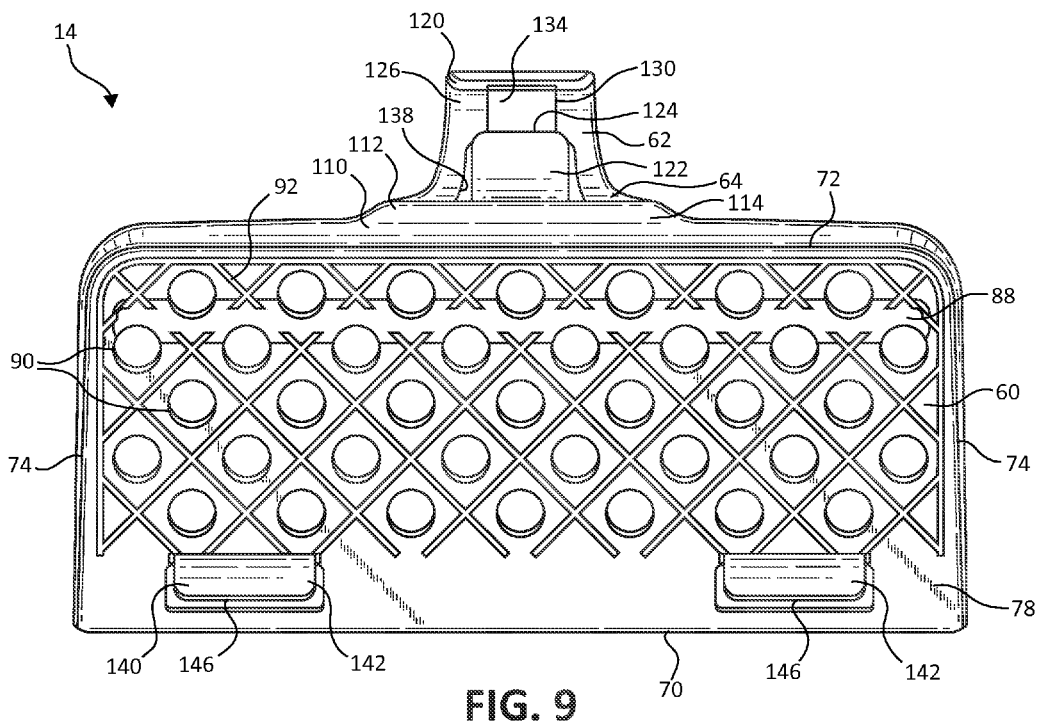
FIG. 9 is a bottom view illustration of the auxiliary support shelf of FIG. 4, according to an embodiment of the present invention.

As shown in FIGS. 1-3, support shelf 14 is provided to bridge the space 58 between handle 26 and top end 50 of gate 42 and to support additional items, such as mobile devices 16, coupons, or other suitable shopping aids or other consumer items while shopping in the retail store. In one embodiment, support shelf 14 is selectively coupled to, that is, removably coupled, to handle 26 and/or is configured to hold mobile devices 16 in at least two different positions, such as the positions shown in FIGS. 2 and 3.

One example of support shelf 14 is illustrated with additional reference to FIGS. 4-9 and includes a platform 60, a cuff 62, and a bridge 64. Platform 60 generally extends in a largely horizontal manner from a position just below handle 26 to top end 50 of gate 42. Bridge 64 extends upwardly from a rear of platform 60 to cuff 62, which is coupled to and, in one example, extends partially around handle 26 of shopping cart 12 when support shelf 14 is in use. In this manner, platform 60 is suspended from handle 26 near a back portion thereof and rests on top end 50 of gate 42 near a front portion thereof, as will be described in additional detail below.

Platform 60 is generally two-dimensional in shape, rigidly extending between a front edge 70 and a rear edge 72 and between opposing side edge 74, which each extend between front edge 70 and rear edge 72 on opposite sides of platform 60. In one example, a width of platform 60, as measured between front edge 70 and rear edge 72 is substantially equal to or greater than a width of space 58 between handle 26 and top end 50 of gate 42 (see, e.g., FIGS. 1 and 13).

Platform 60 defines a top surface 76 opposite a bottom surface 78, which are each substantially planar in one example. In one embodiment, platform 60 defines a substantially linear and lateral elongated recess or groove 80 extending near rear edge 72 and from near one opposing side edge 74 to near the other opposing side edge 74. Lateral groove 80 is sized and shaped to maintain an edge of a mobile device 16 (FIGS. 2 and 3) or other planar consumer item in a manner generally preventing mobile device 16 from inadvertently sliding out of lateral groove 80. In one embodiment, lateral groove 80 is positioned near to, but spaced from rear edge 72 of platform 60 in a manner dividing top surface 76 of platform 60 into front and back portions. In one example, lateral groove 80 extends across a substantial entirety of a width of platform 60, that is at least 75% of, and in one embodiment, at least 90% of, the width of platform 60.

Lateral groove 80 includes a front surface 82, an opposite rear surface 84, and a bottom surface 86 extending between front surface 82 and rear surface 84. In one example, bottom surface 86 has a front-to-back width that is greater than a width of an edge of a mobile device 16, and/or has a greater depth or thickness than a reminder of platform 60 such that bottom surface 78 of platform 60 includes a lateral and substantially linear protrusion 88 to accommodate the depth of lateral groove 80.

In one example, platform 60 includes a plurality of apertures 90 spaced in any desirable pattern within an interior of platform 60. Plurality of apertures 90 provide drainage should any beverages, rain, snow, ice, other liquids, or other meltable substances be collected on top surface 76, allowing any such substances to fall through apertures 90. In one example, one or more of apertures 90 extends partially into lateral groove 80 while in other embodiments, no apertures 90 extend into lateral groove 80. In one example (not shown) the plurality of aperture 90 includes additional apertures in lateral groove 80 to prevent or at least decrease collection of liquids in lateral groove 80. In addition, the plurality of apertures 90 decrease the amount of material needed to form support shelf 14. In one embodiment, platform 60 is substantially continuous with no apertures 90.

In one embodiment, such as where platform 60 requires additional reinforcement, structural ribs 92 (see, e.g., FIG. 5) extend downwardly from bottom surface 78 of platform 60 in a pattern designed to provide platform 60 with additional structural reinforcement, that is, to decrease bending and/or twisting of platform 60 during use of support shelf 15. Structural ribs 92 provide additional strength to platform 60 as an alternate to or in addition to increasing an overall thickness of platform 60 to decrease an amount of material needed to form support shelf 14 while also decreasing an overall weight of support shelf 14. In the illustrated embodiment, structural ribs 92 are substantially linear and formed in a crisscrossing pattern collectively covering a substantial entirety of bottom surface 78 of platform 60. Other arrangements, shapes, and/or numbers of structural ribs 92 is also contemplated depending upon the desired structural integrity and/or structural requirements of support shelf 14.

Support shelf 14 additionally includes a pad 94 in some embodiments. Pad 94 is applied to and covers at least a majority of top surface 76 of platform 60. Pad 94 is substantially planar and is formed of any suitable friction-enhancing material, such as rubber, ABS or other plastic, silicone or other suitable friction enhancing material, and/or includes a tactile enhancement, having a top surface 96 and a bottom surface 98 (see FIG. 10). Pad 94 is coupled to top surface 76 of platform 60 in any suitable manner, such as adhesive. In one example, pad 94 is continuous, but fits into lateral groove 80 while, in other embodiments, pad 94 defines a pad aperture 104 around lateral groove 80.

Figure 10:
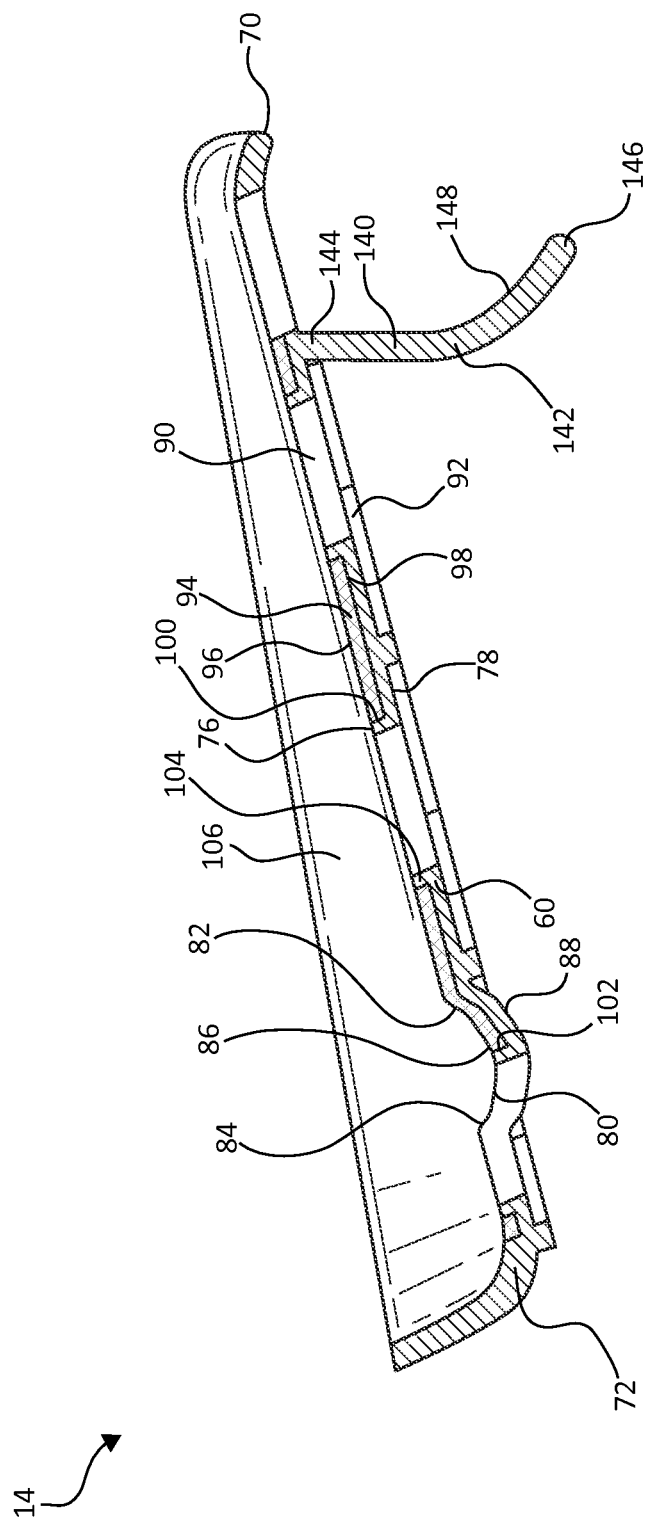
FIG. 10 is a cross-sectional view of the support shelf taken along the line Y-Y in FIG. 8, according to an embodiment of the present invention.

As shown with additional reference to the cross-sectional view of FIG. 10, top surface 76 of platform 60 defines a recessed area 102 for receiving pad 94 extending from rear surface 82 to near front edge 70 of platform 60 and formed around apertures 90. In this manner, pad 94 fits into recessed area 102 such that portions of top surface 76 of platform 60 and top surface 96 of pad 94 collectively define a substantially continuously and substantially planar support surface for receiving the mobile device 16 (FIGS. 2 and 3) or other consumer object.

In one example, recessed area 102 stops short of front edge 70 of platform 60 such that a front edge 99 of pad 94, which is maintained in recessed area 102, is set back from front edge 99 of pad 94. Pad 94 also includes a plurality of apertures 100 aligning with the plurality of apertures 90 of platform 60 so as not to obstruct any of the plurality of apertures 90. In one example, as shown with reference to FIGS. 1 and 8 in view of the cross-sectional view of FIG. 10, platform 60 forms annular rims 104 around each of the plurality of apertures 90 separating each aperture 90 from recessed area 102 of platform 60. Each of the plurality of apertures 90 fits just around a different one of annular rims 104, in one example. Pad 94 is configured to prevent or at least decrease inadvertent sliding of mobile device 16 (FIGS. 2 and 3) and/or other consumer items in lateral and/or longitudinal directions while supported on support shelf 14. In one embodiment, pad 94 is eliminated and/or smaller in size and/or top surface 76 of platform 60 is with other friction enhancing means, such as a texture, printed or adhesive friction enhancing strips, or other suitable friction adding material. In one embodiment, such as where pad 94 is smaller or eliminated, top surface 76 of platform 60 may independently serve as the support surface of support shelf 14 for interacting with consumer items placed thereon.

A sidewall 106 extends around one or more of rear edge 72 and opposing side edges 74, according to one embodiment. Sidewall 106 is configured and positioned to catch or constrain any items that may slide rearwardly or to either lateral side on the support surface while an associated shopping cart 12 (FIGS. 1-3) is moved. Sidewall 106 additionally provides structural rigidity to the overall support shelf 14. In one example, sidewall 106 tapers to a smaller height near front edge 70 than rear edge 72 of support shelf 14.

In one embodiment, bridge 64 extends from rear edge 72 of platform 60 and/or from sidewall 106 upwardly to cuff 62 in a manner spacing cuff 62 from platform 60. Bridge 64 may take on any number of configurations, as will be apparent to those of skill in the art reading this application as bridge 64 extends between a platform 60 or first end 110 nearest platform 60 and cuff 62 or second end 112 nearest cuff 62. Bridge 64 extends primarily in lateral and vertical directions forming a first primary or rear surface 114 and a second primary or front surface 116. Rear surface faces away from front edge 70 of platform 60, while front surface 116 faces toward front edge 70.

In one example, bridge 64 has a lateral width that is less than a lateral width of platform 60, but similar to or tapering in width to cuff 62. While bridge 64 generally extends in a direction substantially perpendicular to platform in one embodiment, in other embodiments bridge 64 extends away from platform 60 with an angle of between about 45 degrees and about 135 degrees relative to platform 60 in either a linear, partially linear, curvilinear, and/or partially curvilinear manner.

Cuff 62 is sized and shaped to selectively couple with handle 26 of shopping cart 12 without use of additional tools or securement devices and extends from an end of bridge 64 opposite platform 60. In one example, at least a portion of cuff 62 extends from bridge 64 with a rearward curvature to a top cuff end 120 thereof. In the embodiment illustrated in FIGS. 1-7, cuff 62 terminates in cuff top end 120 at a point spaced rearwardly from and above a topmost edge of bridge 64 and below a topmost point of cuff 62 and support shelf 14. In this example, a lower cuff wall 122 extends from rear surface 114 near second end 112 of bridge with a curvilinear and/or rearwardly and downwardly extending orientation to bottom cuff end 124 of cuff 62.

Figure 11:
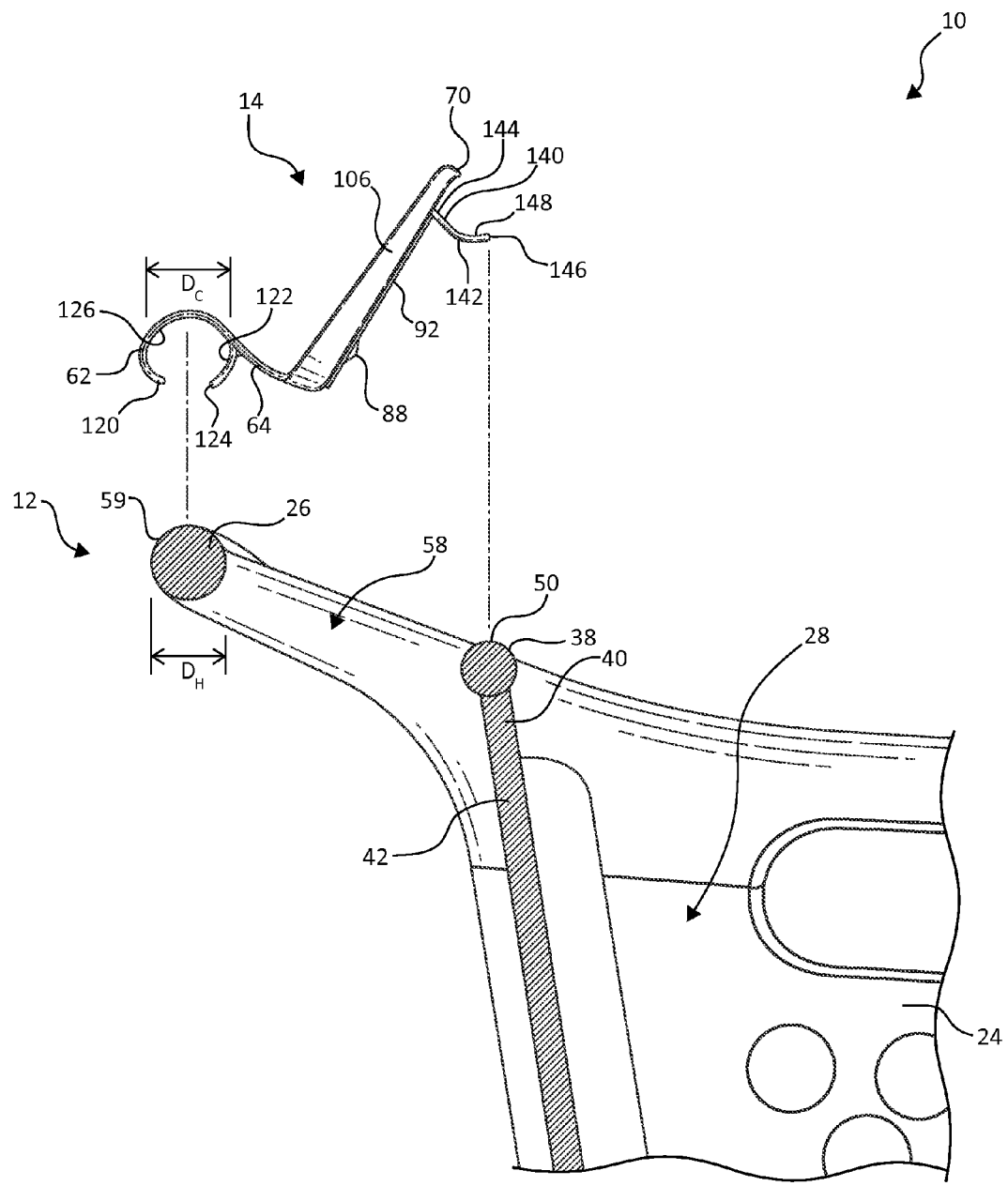
FIG. 11 is a cross-sectional view of the shopping assembly taken along the line X-X in FIG. 2 with the auxiliary support shelf separated from the shopping cart, according to an embodiment of the present invention.

Cuff 62 defines an inner surface 126 extending from top cuff end 120 to bottom cuff end 124. In one embodiment, inner surface 126 substantially encompasses and defines a shape substantially identical or otherwise similar to a cross-sectional shape of handle 26 of shopping cart 12. For example, as illustrated in FIG. 11, where handle 26 has an outside diameter of $D_H$, inner surface 126 of cuff 62 defines an inside diameter of $D_C$ that is substantially equal to or slightly larger than outside diameter $D_H$. In one example, cuff 62 is at least partially flexible to allow transition of cuff 62 between a slightly flexed or stretched position to receive handle 26 to an unflexed or biased position at least partially wrapped around handle 26.

In one embodiment, cuff 62 includes cutouts or recesses 130 and/or 132 along inner surface 126 of cuff 62. For example, recess 130 extends along a portion of inner surface 126 near to or immediately adjacent top cuff end 120 terminating prior to or, alternatively, extending continuously to bottom cuff end 124. A top pad 134 is received in recess 130 to collectively define inner surface 126 with a remainder of cuff 62. In one example, recess 132 extends along a portion of inner surface 126 near to or immediately adjacent bottom cuff end 124 terminating prior to or, alternatively, extending continuously to top cuff end 120. A bottom pad 136 is maintained in recess 132 to collectively define inner surface 126 with a remainder of cuff 62. In one embodiment, top pad 134 and bottom pad 136 are both similar pads formed of any rubber, ABS or other plastic, silicone, and/or other suitable friction enhancing material and/or include a tactile enhancement configured to provide additional friction and/or cushion to the coupling between cuff 62 and handle 26 of shopping cart 12.

Other optional features of cuff 62 and/or support shelf 14 as a whole will be apparent to those of skill in the art. For instance, as illustrated, cuff 62 may includes one or more internal apertures 138 therein, to decrease the material needed to form support shelf 14 and/or limit the amount of material in contact with handle 26 of shopping cart 12 during use, allowing handle 26 to subsequently be more easily disengaged from handle 26 when desired. While cuff 62 is shown with a decreasing lateral width as it extends toward top cuff end 120, other embodiments are contemplated and will be apparent to those of skill in the art after reading this application.

In one embodiment, support shelf 14 additionally includes one or more front securement mechanisms 140 near the front of support shelf 14 to more securely couple support shelf 14 with shopping cart 12. For example, support shelf 14 includes at least one front securement mechanism 140 or, as illustrated, at least two front securement mechanisms 140, including a curvilinear protrusion 142 or hooked member extending downwardly and then forwardly from a bottom surface 78 of platform 60 near front edge 70 of platform 60 and terminating in a lower free end 146 opposite platform 60. Curvilinear protrusion 142 defines a front facing surface 148 sized, shaped, and/or otherwise configured to receive a corresponding portion of shopping cart 12, for example, gate and seat assembly 40, more particularly, top end 50 and/or surrounding portions of gate 42, in one example. In one example, substantially all of support shelf 14, for example, platform 60, cuff 62, and bridge 64, other than pad 94 are formed as a single piece of a suitable material such as injection molded plastic.

Figure 12:
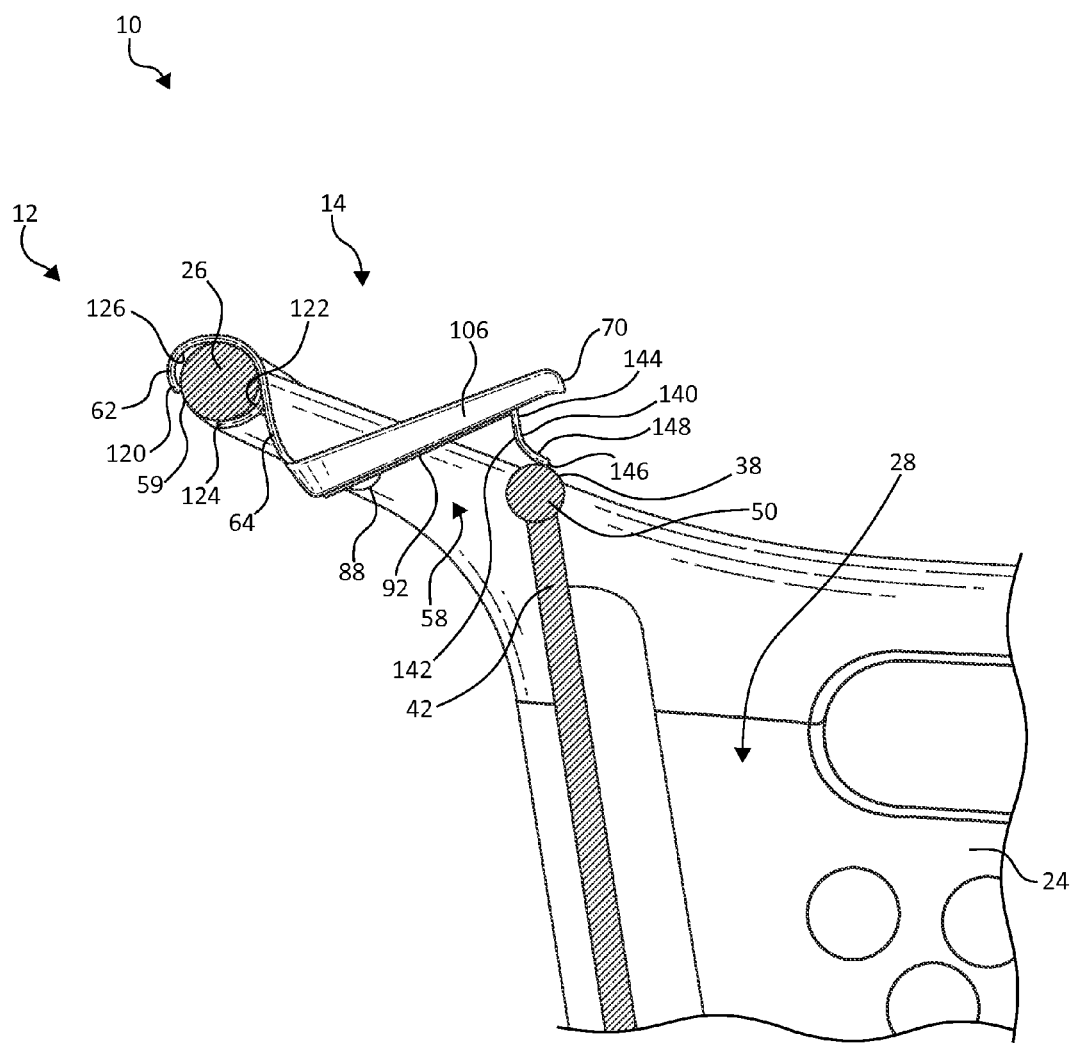
FIG. 12 is the cross-sectional view of FIG. 11 with the auxiliary support shelf partially coupled with the shopping cart, according to an embodiment of the present invention.

During use, support shelf 14 is selectively coupled with and/or uncoupled from shopping cart 12, for instance, without the use of tools. For example, as shown in FIG. 11, support shelf 14 is positioned such that a space between top cuff end 120 and bottom cuff end 124 faces handle 26, and platform 60 extends at least partially toward storage area 28 in basket 24. Support shelf 14 is moved toward handle 26 such that cuff 62 contacts handle 26 and, with continued movement, cuff 62 flexes to receive handle 26 therein. In this manner, outside surface 38 of handle 26 interacts with inner surface 126 of cuff 62 as illustrated in FIG. 12. In one example, cuff 62 extends around at least 280 degrees of handle 26. In one example, top pad 134 and/or bottom pad 136 of cuff 62 interact with outside surface 38 of handle 26 to decrease inadvertent lateral shifting of support shelf 14 relative to handle 26 and/or inadvertent rotation of cuff 62 about handle 26.

Figure 13:
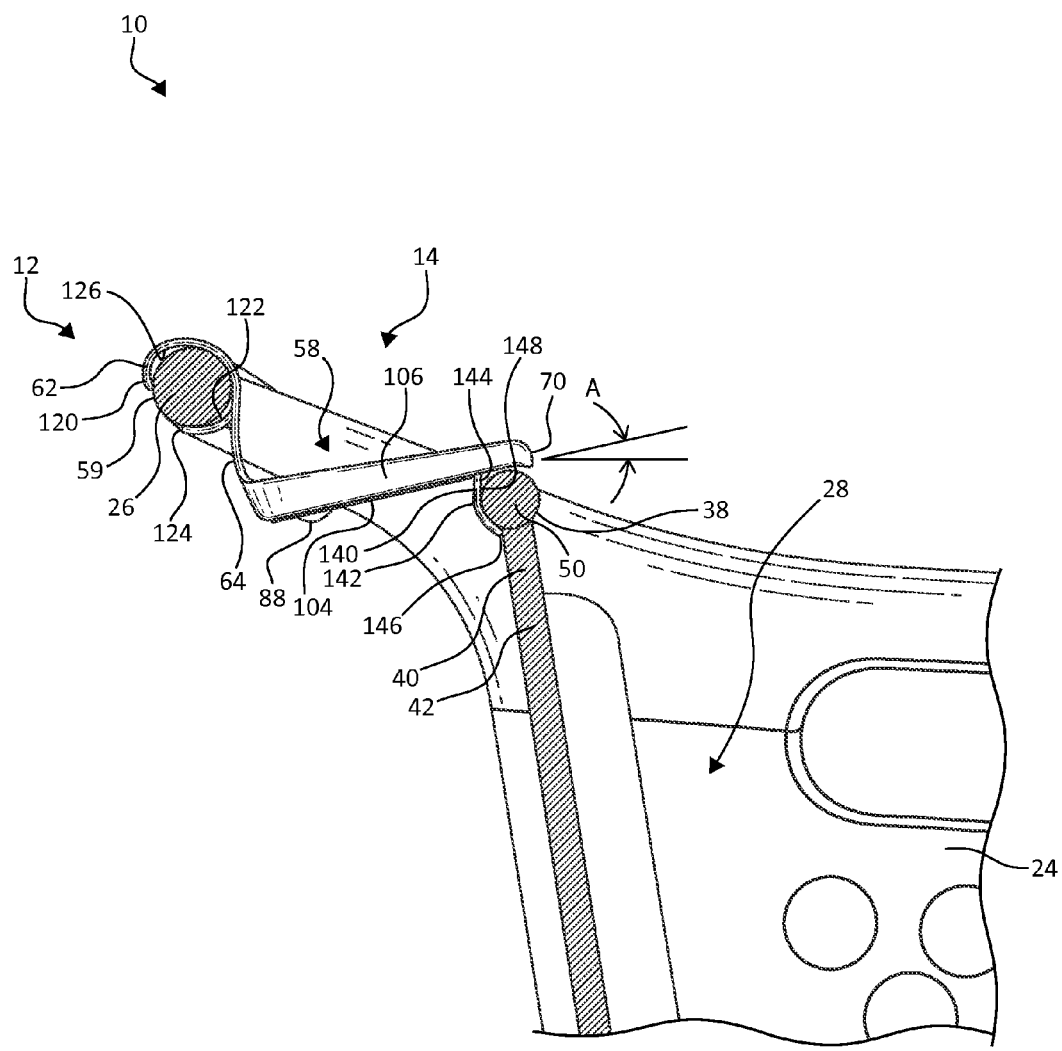
FIG. 13 is the cross-sectional view of FIG. 11 with the auxiliary support shelf fully coupled with the shopping cart, according to an embodiment of the present invention.

In one embodiment, upon coupling of cuff 62 to handle 26, support shelf 14 is rotated from the position indicated in FIG. 12, about handle 26, for example, in a clockwise direction, to move platform 60 into contact with another portion of shopping cart 12. For instance, in one embodiment, bottom surface 78 of platform 60 contacts top end 50 of gate 42 (i.e., rear wall) of shopping cart 12 as illustrated in FIG. 13. In this manner, support shelf 14 is vertically supported by handle 26 and gate 42 and extends across space 58 therebetween in a bridge-like manner. In one example, where support shelf 14 includes front securement mechanism(s) 140, movement of platform 60 into interaction with gate 42 also causes free ends 146 of curvilinear protrusions 142 to contact gate 42, flex around top end 50 of gate 42, and return to a biased positioned under a portion of gate 42. For instance, where top end 50 of gate 42 is formed by a substantially horizontal member with a circular cross-sectional shape, front facing surfaces 148 of curvilinear protrusions 142 contact top end 50 of gate 42 in a manner at least partially secured under a lip or rotation of top end 50 to decrease inadvertent rotation of support shelf 14 about handle 26 and, thereby, to decrease inadvertent lifting of support shelf 14 away from top end 50 of gate 42. In one embodiment, support shelf 14 extends forwardly from handle 26 toward, but not into contact with, gate 42. In this manner, at least in one example, support shelf 14 is hung via handle 26, but is not otherwise supported by shopping cart 12.

Figure 14:
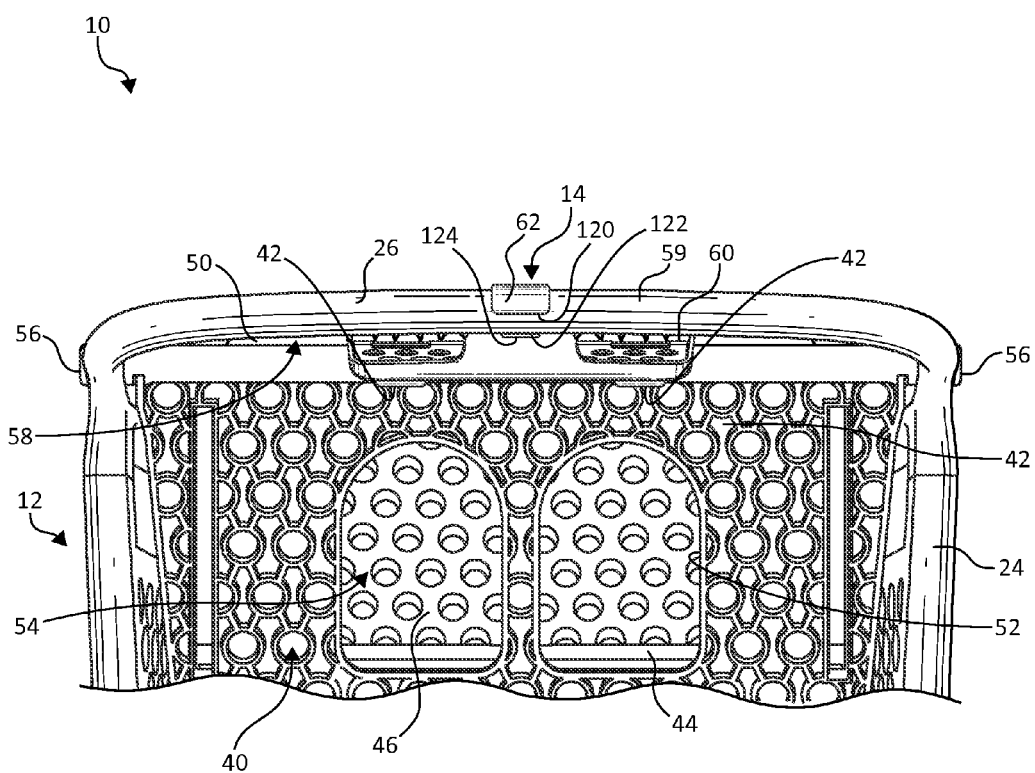
FIG. 14 is a partial rear view of the shopping assembly of FIG. 1, according to an embodiment of the present invention.
Figure 15:
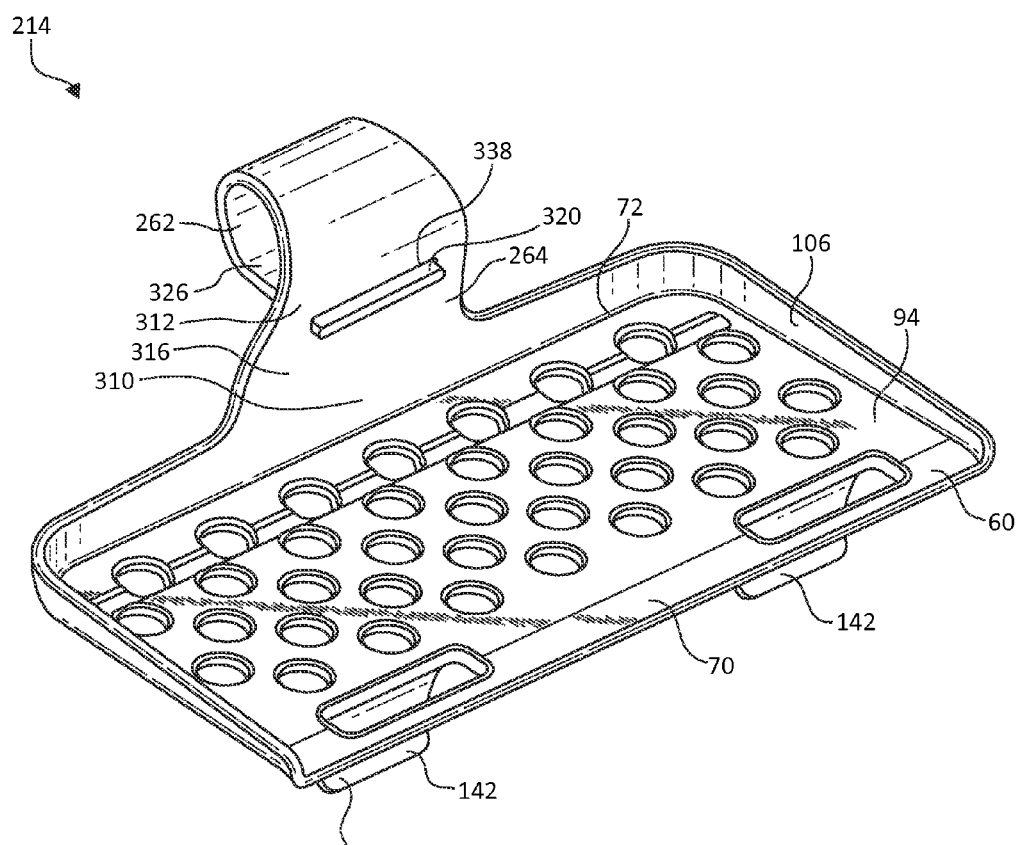
FIG. 15 is a perspective view illustration of an auxiliary support shelf, according to an embodiment of the present invention.
Figure 16:
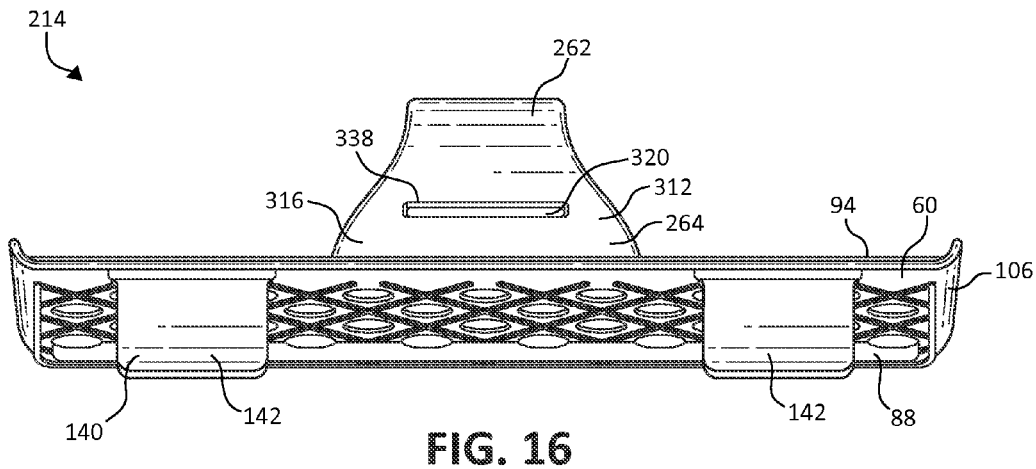
FIG. 16 is a front view illustration of the auxiliary support shelf of FIG. 15, according to an embodiment of the present invention.
Figure 17:
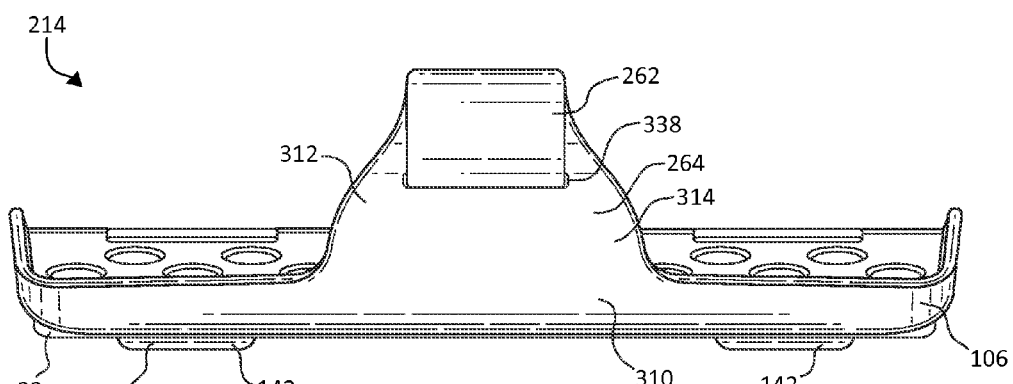
FIG. 17 is a rear view illustration of the auxiliary support shelf of FIG. 15, according to an embodiment of the present invention.
Figure 18:
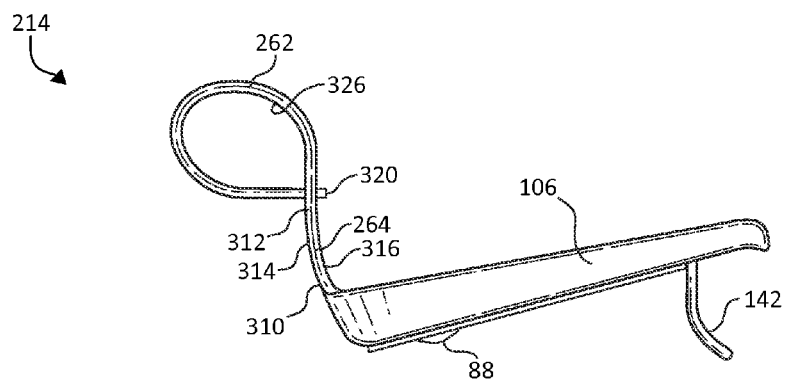
FIG. 18 is a right side view illustration of the auxiliary support shelf of FIG. 15 where the left side view is a mirror image thereof, according to an embodiment of the present invention.
Figure 19:
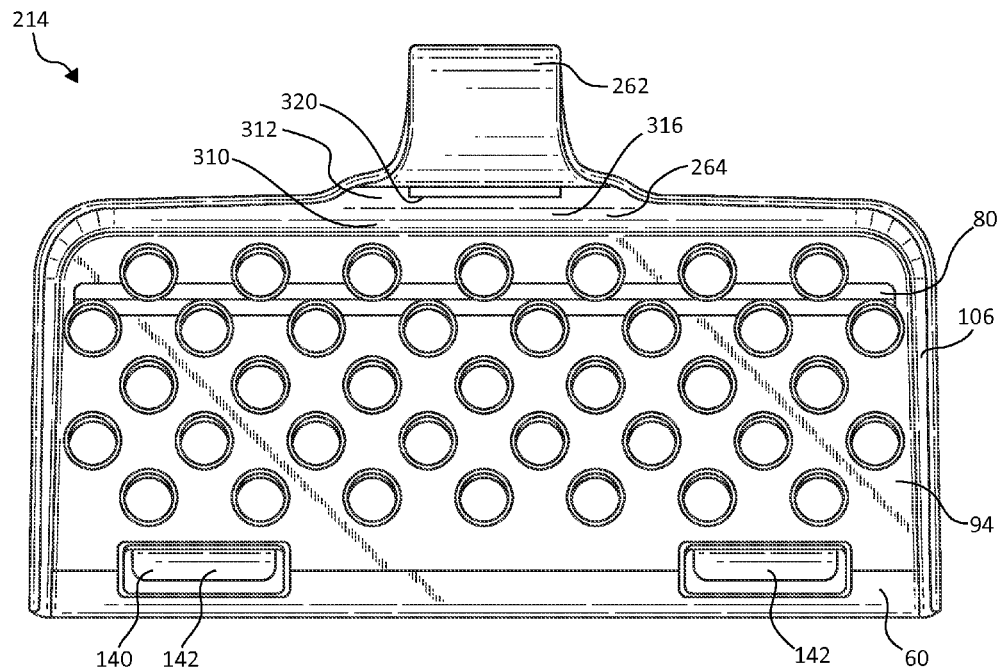
FIG. 19 is a top view illustration of the auxiliary support shelf of FIG. 15, according to an embodiment of the present invention.
Figure 20:
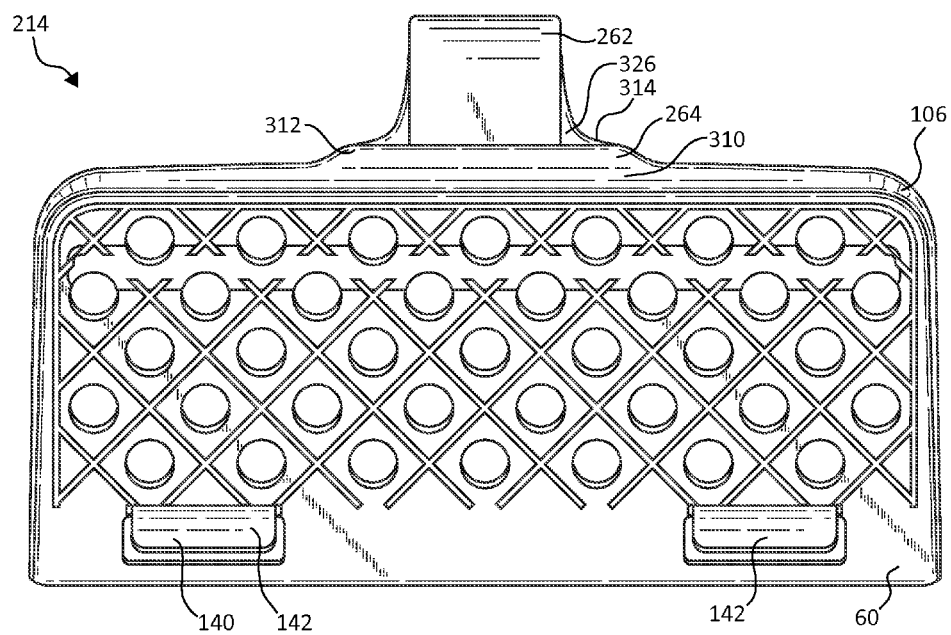
FIG. 20 is a bottom view illustration of the auxiliary support shelf of FIG. 15, according to an embodiment of the present invention.

As illustrated with reference to FIGS. 13 and 14, in one example, support shelf 14 is maintained on shopping cart 12 such that top surface 76 of support shelf 14 extends at an inclined angle A relative to a true horizontal position. For example, angle A is between about 10 degrees and about 45 degrees, more particularly, between about 20 degrees and about 30 degrees. Angle A provides support shelf 14 in a manner to maintain consumer goods, such as mobile device 16, at a viewing angle pleasing to either the consumer pushing shopping cart 12 and/or a child positioned in child seating area 54 of shopping cart 12 as will be further described below. In addition, in one embodiment, angle A also promotes passage or drainage of liquids off of support shelf 14 via the plurality of apertures 90.

Once support shelf 14 is secured to shopping cart 12, consumers using shopping cart 12 are able to utilize support shelf 14 to support their items. In one example, support shelf 14 is configured to support mobile device 16 in at least two positions. For example, with additional reference to FIG. 2, support shelf 14 can support mobile device 16 laid upon top surface 76 thereof. More specifically, mobile device 16 includes a display surface 170 and an opposite, rear surface 172, both surrounded by a device perimeter edge 174. Rear surface 172 is laid on top surface 76 of support shelf 14 so display surface 170, which includes device display screen 176, faces upwardly. In this usage, the anti-skid properties of friction enhancing pad 94 prevent or at least decrease inadvertent lateral (i.e., side-to-side) movement and/or inadvertent longitudinal (i.e., font-to-back) movement of mobile device 16 upon support shelf 14. This position of mobile device 16 is particularly advantageous when an adult or teenage user that is driving shopping cart 12 is utilizing a shopping related application that generally includes a plurality of consumer checks with the application and/or the mobile phone during a shopping trip to the retail store.

In another embodiment or in another use of the same support shelf 14, support surface 14 receives mobile device 16 in a partially upright position as illustrated in FIG. 3 facing toward front basket sidewall 32, that is, away from the consumer pushing shopping cart 12. More particularly, in one embodiment, one segment of device perimeter edge 174 of mobile device 16 is placed in lateral groove 80 of support shelf 14 and mobile device 16 is angled rearwardly as it extends from lateral groove 80 such that rear surface 172 of mobile device 16 rests against a front facing surface of cuff 62 and/or bridge 64. In this manner, mobile device 16 is maintained in a substantially vertical position, that is, a position extending at an angle of about 30 degrees or less from vertical, with display surface 170 and display screen 176 facing away from handle 26 of shopping cart 12. While facing forwardly away from handle 26, display surface 170 and display screen 176 face toward child seating area 54 for easy viewing by any child (not shown) that may be seated in child seating area 54. When mobile device 16 faces child, child may interact with and/or otherwise be occupied by mobile device 16 while the accompanying adult or teenager shops in the retail store.

Other embodiments of and/or enhancements to support shelf 14 will be apparent to those of skill in the art upon reading this application. For example, a support shelf 214, as illustrated in FIGS. 15-20, is an alternative to support shelf 14 and according to an embodiment of the present invention. Like support shelf 14 (see, e.g., FIGS. 4-9), support shelf 214 includes a similar platform 60 with front edge 70, pad 94, and sidewall 106. Support shelf 214 additionally includes a cuff 262 and a bridge 264. Bridge 264 extends from a platform end 310 adjacent platform 60 to a cuff end 312 adjacent cuff 262 in a similar manner as described above for bridge 64 extending between platform 60 and cuff 62. Front surface 316 of bridge 264 faces front edge 70 of platform 60.

Cuff 262 is sized and shaped to selectively couple with handle 26 of shopping cart 12 without use of additional tools or securement devices and extends from an end of bridge 264 opposite platform 60. In one example, at least a portion of cuff 262 extends from bridge 264 with an initially upward and rearward curvature looping back around to a free end 320 of cuff 262. In the embodiment illustrated in FIGS. 15-20, cuff 262 terminates in free end 320 positioned adjacent to and/or extending through an inner surface 326 of cuff 262 that is adjacent bridge 264. In one example, a top portion of bridge 264 defines an internal aperture 338 with a substantially identical shape and substantially identical or slightly larger cross-sectional size than cuff 262 at free end 320 thereof. Cutout 338 is positioned to receive free end 320 of cuff 262. In this manner, cuff 262 is configured to be temporarily flexed away from bridge 264 to receive handle 26 of shopping cart 12, and then unflexed, e.g., due to biasing of cuff 262, to extend partially through internal aperture 338. In one example, cuff 262 wraps entirely around a segment of handle 26 before passing through internal aperture 338 to selectively secure cuff 262 in place around handle 26. Cuff 262 may include pads similar to pads 134 and 136 of cuff 62 and/or have other modifications while still allowing cuff 262 to be coupled with handle 26 of shopping cart 12.

Although the invention has been described with respect to particular embodiments, such embodiments are meant for the purposes of illustrating examples only and should not be considered to limit the invention or the application and uses of the invention. Various alternatives, modifications, and changes will be apparent to those of ordinary skill in the art upon reading this application. Furthermore, there is no intention to be bound by any theory presented in the preceding background of the invention or the above detailed description.

What is claimed is:

1. A shopping assembly comprising:
a shopping cart including a basket and a handle, the basket including a rear wall having a top end, and the handle being spaced from the top end of the rear wall defining a space between the handle and the top end of the rear wall;
a support shelf comprising:
a cuff wrapped at least partially around the handle of the shopping cart to couple the support shelf to the shopping cart,
a platform positioned below and extending forwardly relative to the cuff toward the rear wall of the shopping cart, the platform having a topmost surface and a bottom surface opposite the topmost surface and rigidly extending between a front edge and a rear edge thereof, wherein the cuff is positioned on a rear side of the rear edge of the platform, and
a bridge extending between the platform and the cuff coupling the platform to the cuff and vertically spacing the topmost surface of the platform downwardly from a bottommost surface of the cuff, wherein the cuff extends upwardly from the bridge curving rearwardly and then downwardly as the cuff extends further away from the bridge to terminate in a free cuff end.

2. The shopping assembly of claim 1, wherein a portion of the bottom surface of the platform rests on the top end of the rear wall of the shopping cart.

3. The shopping assembly of claim 1, wherein the cuff and the platform are formed together as a single piece, and the front edge of the platform is positioned adjacent the rear wall of the shopping cart.

4. The shopping assembly of claim 1, wherein the cuff of the support shelf is configured to flex to receive the handle of the shopping cart and is biased to return to an unflexed position to grasp the handle.

5. The shopping assembly of claim 1, wherein the support shelf includes at least one securement mechanism depending from the platform near the front edge of the platform, and the at least one securement mechanism is configured to flex to receive a portion of the rear wall of the shopping cart to further couple the support shelf to the shopping cart in a manner preventing rotation of the support shelf about the handle.

6. The shopping assembly of claim 5, wherein the at least one securement mechanism includes a curvilinear protrusion that fits immediately adjacent and contacts the rear wall along only one or both of a surfaces of the rear wall facing the handle and a surface of the rear wall facing downwardly such that the support shelf is securely maintained between the rear wall and the handle in a manner preventing rotation of the support shelf about the handle.

7. The shopping assembly of claim 1, wherein the support shelf includes a sidewall extending around at least three sides of a perimeter of the platform.

8. The shopping assembly of claim 1, wherein:
the bridge includes an interior aperture, and
the cuff extends through the interior aperture such that the free cuff end is positioned on a front side of the bridge.

9. The shopping assembly of claim 1, wherein:
the free cuff end is a top free cuff end of the cuff, and
the cuff includes a lower cuff wall curving rearwardly and upwardly from a rear surface of the bridge toward the top free cuff end to form a second free cuff end.

10. The shopping assembly of claim 1, wherein the platform includes an elongated groove near and extending substantially parallel to the rear edge of the platform at a position entirely between the cuff and the rear wall of the shopping cart, and the elongated groove is sized to receive an edge of a mobile device.

11. The shopping assembly of claim 10, wherein the elongated groove interrupts the topmost surface of the platform dividing the topmost surface of the platform into a front portion in front of the elongated groove and a back portion behind the elongated groove.

12. The shopping assembly of claim 10, wherein the elongated groove is positioned such when the edge of the mobile device is received with the elongated groove, the mobile device angles upwardly and rearwardly from the elongated groove and a side of the mobile device rests against the cuff such that the mobile device faces toward the basket of the shopping cart.

13. The shopping assembly of claim 1, wherein the support shelf includes a means for enhancing friction overlaying at least a portion of the topmost surface of the platform.

14. The shopping assembly of claim 13, wherein the means for enhancing friction includes a pad adhered to the topmost surface of the platform.

15. The shopping assembly of claim 1, wherein the support shelf is readily coupled to and uncoupled from the shopping cart without the use of tools.

16. The shopping assembly of claim 1, wherein the shopping cart includes a child seating area within the basket on a front side of the rear wall opposite the handle.

17. The shopping assembly of claim 1, wherein the topmost surface of the platform is substantially planar and extends upwardly at an inclined angle between about 10 degrees and about 45 degrees as the platform extends from the rear edge to the front edge of the platform.

18. A support shelf for use with a shopping cart including a basket rear wall and a handle spaced rearwardly from the basket rear wall, the support shelf comprising:
a cuff sized and shaped to wrap at least partially around the handle of the shopping cart to couple the support shelf to the shopping cart, and
a platform positioned entirely below and extending forwardly relative to the cuff, the platform including a topmost surface, a bottom surface opposite the topmost surface, a front edge, and a rear edge opposite the front edge, wherein:
the cuff is positioned on a rear side of the rear edge of the platform, and
the platform is sized to extend forwardly from the cuff to the front edge in a manner positioning a portion of the bottom surface of the platform over a top end of the basket rear wall of the shopping cart;
wherein the platform is substantially planar and defines an elongated groove extending across the platform near the rear edge of the platform and below the topmost surface of the platform, the elongated groove is configured to receive an edge of a planar consumer item, and the platform includes a means for enhancing friction overlaying at least a portion of the topmost surface of the platform above the elongated groove.

19. The support shelf of claim 18, further comprising, at least one securement mechanism depending downwardly and then forwardly from the bottom surface of the platform and configured to interface with the basket rear wall of the shopping cart when the cuff is wrapped around the handle of the shopping cart.

20. A method of enhancing a shopping cart, the method comprising:
providing a support shelf, the support shelf including:
a curvilinear cuff, and
a platform positioned below and extending forwardly relative to the cuff, the platform including a top surface and a bottom surface opposite the top surface and extending between a front edge and a rear edge thereof, wherein the rear edge is closer to the cuff than the front edge, and
front securement means depending first downwardly from the bottom surface of the platform and then forwardly toward the front edge of the platform;
coupling the cuff of the support shelf to a handle of the shopping cart, wherein:
the shopping cart further includes a basket and a basket rear wall,
the handle is positioned rearwardly from the basket rear wall,
the platform extends from the handle of the shopping cart toward the basket rear wall of the shopping cart such that the support shelf bridges a space between the handle and the basket rear wall of the shopping cart and the top surface of the support shelf faces upwardly, and
coupling the cuff of the support shelf to the handle of the shopping cart includes coupling the curvilinear cuff to the handle and downwardly rotating the front edge of the platform about the handle pushing the front securement means into contact with the rear wall such that the front securement means flexes to fit at least partially below a surface of the rear wall.

* * * * *